(12) United States Patent
Billingsley

(10) Patent No.: US 12,304,053 B2
(45) Date of Patent: May 20, 2025

(54) MULTIPURPOSE UTILITY ATTACHMENT DEVICE

(71) Applicant: Jason Billingsley, Omaha, NE (US)

(72) Inventor: Jason Billingsley, Omaha, NE (US)

( * ) Notice: Subject to any disclaimer, the term of this patent is extended or adjusted under 35 U.S.C. 154(b) by 691 days.

(21) Appl. No.: 17/591,765

(22) Filed: Feb. 3, 2022

(65) Prior Publication Data

US 2023/0241757 A1 Aug. 3, 2023

(51) Int. Cl.
| | |
|---|---|
| *B25G 3/28* | (2006.01) |
| *A01B 1/02* | (2006.01) |
| *A01B 1/22* | (2006.01) |
| *B25F 1/02* | (2006.01) |
| *B25G 3/32* | (2006.01) |

(52) U.S. Cl.
CPC .............. *B25G 3/28* (2013.01); *A01B 1/022* (2013.01); *A01B 1/227* (2013.01); *B25F 1/02* (2013.01); *B25G 3/32* (2013.01)

(58) Field of Classification Search
CPC  A01B 1/022; A01B 1/20; A01B 1/227; B25F 1/02; B25G 1/04; B25G 3/16; B25G 3/18; B25G 3/28; A45B 3/00; A45B 5/00
USPC .............................................. 294/24, 51, 57
See application file for complete search history.

(56) References Cited

U.S. PATENT DOCUMENTS

| | | | | |
|---|---|---|---|---|
| 6,270,133 | B1 * | 8/2001 | Babcock ................. | B65G 7/12 294/26 |
| 6,711,772 | B2 * | 3/2004 | Grassi ..................... | A45B 3/00 43/6 |
| 7,383,597 | B2 * | 6/2008 | Steiner .................... | A45B 3/00 5/121 |
| 8,220,852 | B2 | 7/2012 | Fenstemaker | |
| 8,308,209 | B1 * | 11/2012 | Bibow .................... | B25G 1/04 294/182 |
| 8,544,910 | B1 | 10/2013 | Weist | |
| 9,775,271 | B2 | 10/2017 | Bartnik | |
| D829,479 | S | 10/2018 | Pinholster, Jr. | |
| D838,151 | S | 1/2019 | Macyszyn | |
| 2003/0184104 | A1 * | 10/2003 | Ping ....................... | A01B 1/227 294/57 |
| 2007/0079442 | A1 | 4/2007 | Stoll | |
| 2008/0179904 | A1 * | 7/2008 | Huang .................... | E01H 5/02 294/51 |
| 2009/0038663 | A1 | 2/2009 | Juslin | |
| 2011/0271580 | A1 | 11/2011 | Carse | |
| 2015/0366122 | A1 | 12/2015 | Vera Andrades | |

FOREIGN PATENT DOCUMENTS

WO  WO2014131112   9/2014

* cited by examiner

*Primary Examiner* — James R Bidwell

(57) ABSTRACT

A multipurpose utility attachment device for equipping a variety of tools to an adjustable shaft includes a grip. The grip is a handle and has a flat end. A telescopic shaft comprises a first portion, a second portion, and a pair of spring pins. A proximal end of the first portion is coupled to the flat end of the grip. The second portion is nested within the first portion. The second portion can adjust the length of the telescopic shaft by moving within the first portion. A pair of spring pins is positioned within the second portion and secures the second portion in a fixed length relative to the first portion. A second spring pin is used for securing a utility attachment to the telescopic shaft. The utility attachment can be a variety of wilderness survival tools. A hammock attachment can be used by a pair of telescopic shafts.

17 Claims, 6 Drawing Sheets

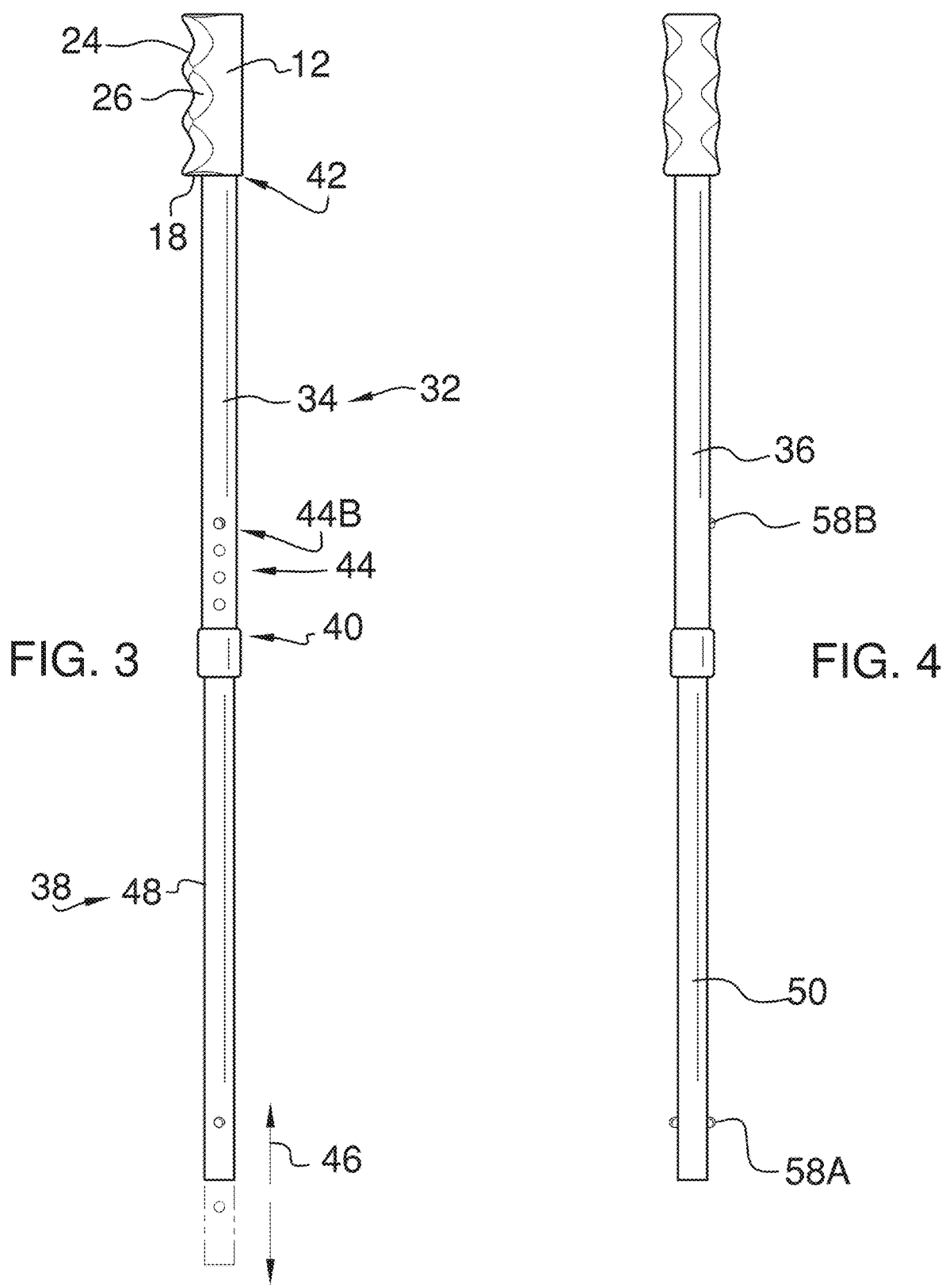

MULTIPURPOSE UTILITY ATTACHMENT DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to multifunctional tool and handle sets and more particularly pertains to a new multifunctional tool and handle set for equipping a variety of tools to an adjustable shaft.

(2) Description of Related Art Including Information Disclosed Under 37 CFR 1.97 and 1.98

The prior art relates to multifunctional tool and handle sets. The prior art includes a variety of multifunctional tool and handle sets having interchanging abilities with a variety of tools. Furthermore, the prior art relates to a variety of multifunctional tool and handle sets having a shaft or a handle. Known prior art lacks a multifunctional tool and handle set comprising a handle attached to a telescopic shaft with interchanging abilities for a variety of tools configured for wilderness survival including a hammock attachment.

BRIEF SUMMARY OF THE INVENTION

An embodiment of the disclosure meets the needs presented above by generally comprising a grip. The grip is a handle with a cylindrical shaped body. The cylindrical shaped body has an end. A telescopic shaft comprises a first portion, a second portion, and a pair of spring pins. A proximal end of the first portion is coupled to the end of the grip. The second portion is nested within the first portion. The first portion is in a fixed position relative to the second portion whereby the second portion can adjust the length of the telescopic shaft. A pair of spring pins is positioned within the second portion. A first spring pin of the pair of spring pins is used for securing the second portion to the first portion. A second spring pin is used for securing a utility attachment to the telescopic shaft. The utility attachment is configured for being a variety of configurations for wilderness survival. Furthermore, a hammock has a pair of edges where each of the edges has a sleeve. The sleeve defines a space where each telescopic shaft of a pair of telescopic shafts can be lodged.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a side view of an embodiment of the disclosure.

FIG. 4 is a back view of an embodiment of the disclosure.

DETAILED DESCRIPTION OF THE INVENTION

Figure 1:
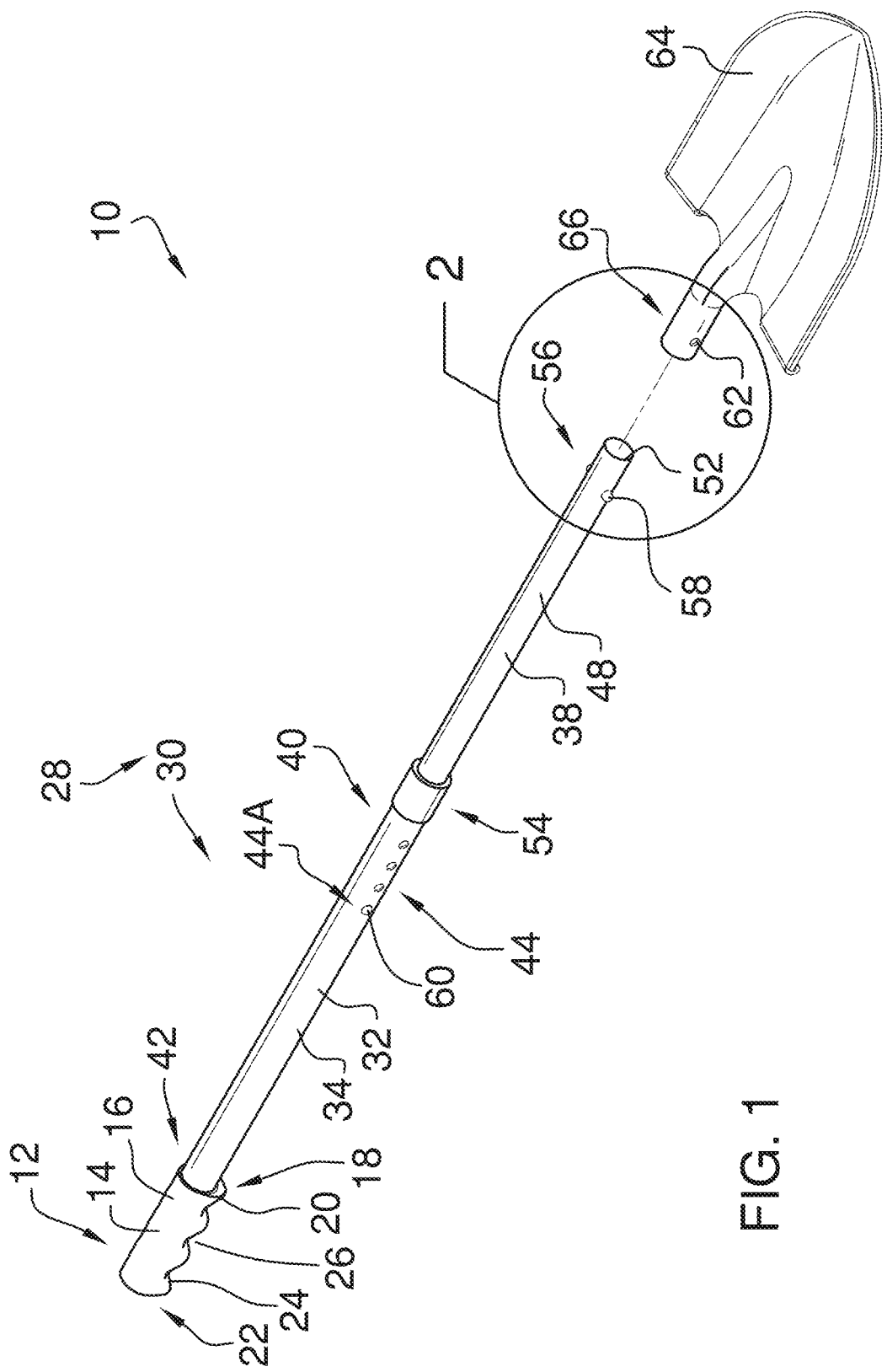
FIG. 1 is an isometric view of a multipurpose utility attachment device according to an embodiment of the disclosure.
Figure 2:
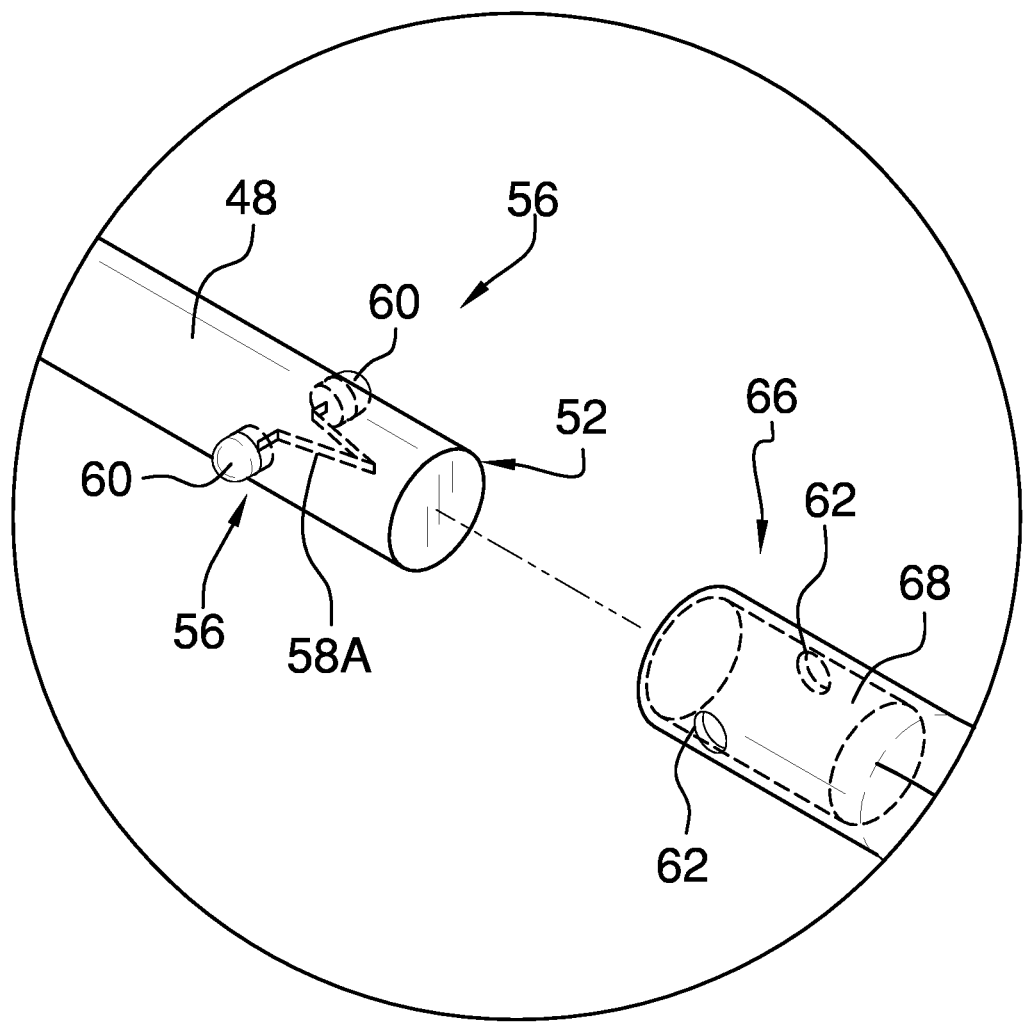
FIG. 2 is a detail view of an embodiment of the disclosure taken from magnify circle 2 of FIG. 1.
Figure 5:
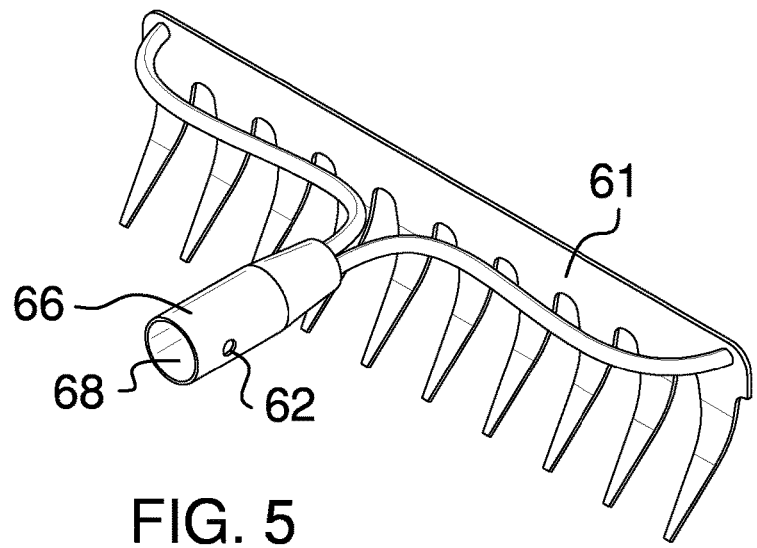
FIG. 5 is an isometric view of an embodiment of the disclosure.
Figure 6:
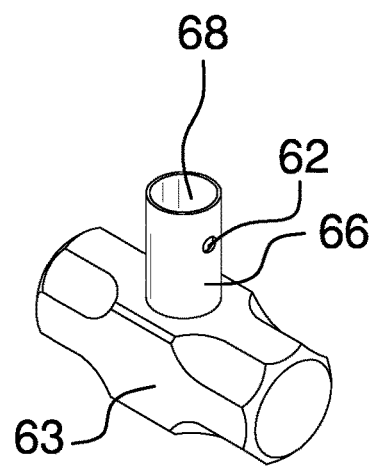
FIG. 6 is an isometric view of an embodiment of the disclosure.
Figure 7:
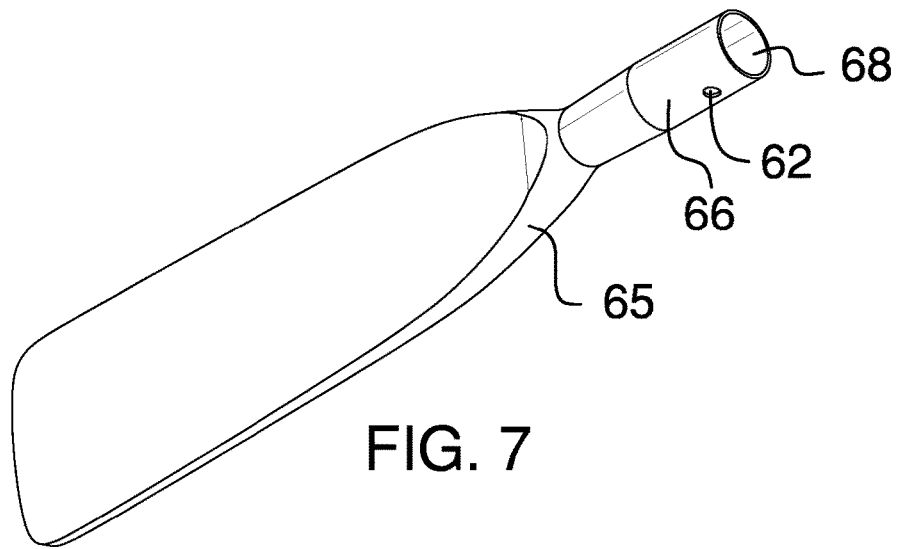
FIG. 7 is an isometric view of an embodiment of the disclosure.
Figure 8:
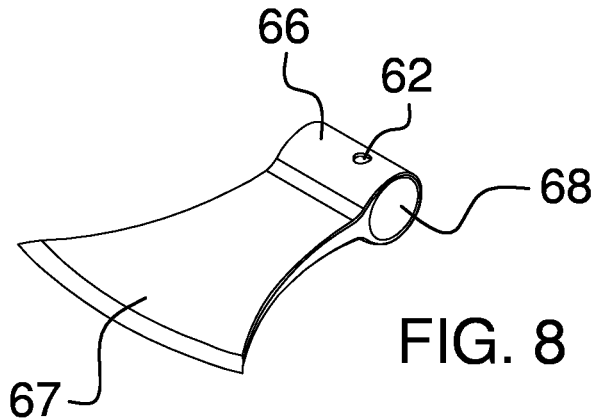
FIG. 8 is an isometric view of an embodiment of the disclosure.
Figure 9:
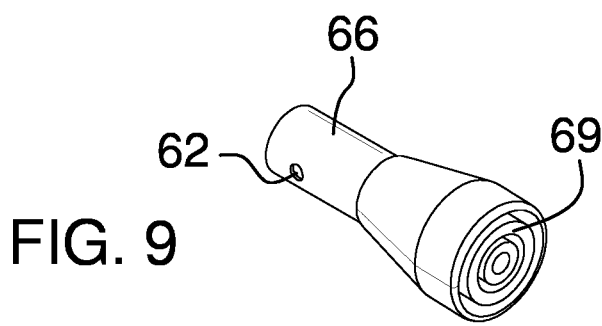
FIG. 9 is an isometric view of an embodiment of the disclosure.
Figure 10:
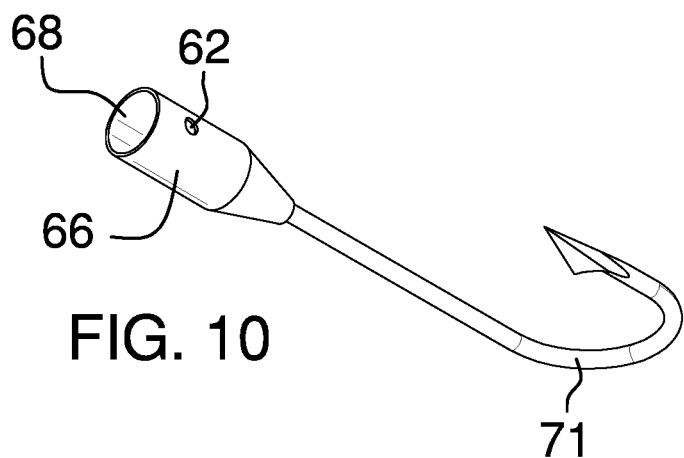
FIG. 10 is an isometric view of an embodiment of the disclosure.
Figure 11:
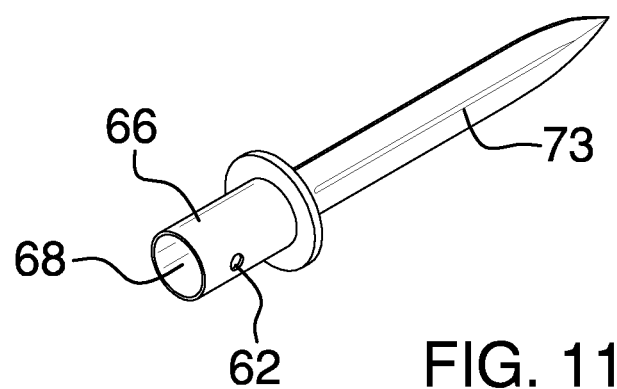
FIG. 11 is an isometric view of an embodiment of the disclosure.
Figure 12:
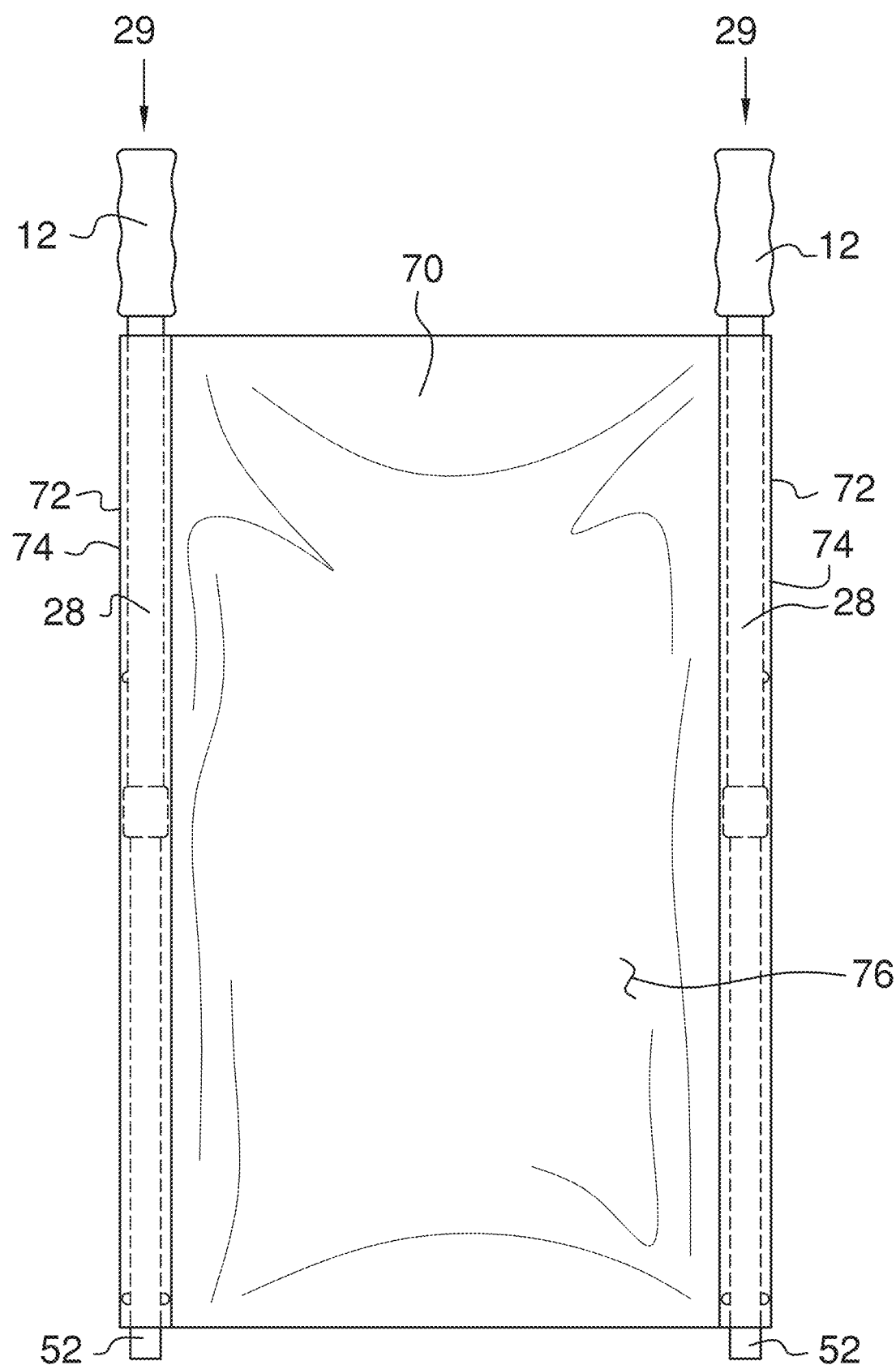
FIG. 12 is a front view of an embodiment of the disclosure.

With reference now to the drawings, and in particular to FIGS. 1 through 12 thereof, a new multifunctional tool and handle set embodying the principles and concepts of an embodiment of the disclosure and generally designated by the reference numeral 10 will be described.

As best illustrated in FIGS. 1 through 12, the multipurpose utility attachment device 10 generally comprises a grip 12. The grip 12 is a handle 14 that is cylindrical shaped 16. The grip 12 has an end 18 that is flat 20. A bottom surface 22 of the grip 12 has a plurality of cut outs 24. Each of the cut outs 24 is a semicircular shape 26 and each of the cut outs 24 creates a space for the fingers of the user to be positioned. The grip 12 provides a suitable area for the user to hold the multipurpose utility attachment device 10.

A telescopic shaft 28 is the body 30 of the multipurpose utility attachment device 10. The telescopic shaft 28 comprises a first portion 32. The first portion 32 is a tube 34 having a hollow interior 36. The hollow interior 36 defines a space where a second portion 38 of the telescopic shaft 28 is nested within.

The first portion 32 has a distal end 40 and a proximal end 42 relative to the grip 12. The proximal end 42 is coupled to the end 18 of the grip 12 and is positioned concentric to the grip 12. The distal end 40 of the first portion 32 is an open end. A plurality of holes 44 is positioned proximate to the distal end 40. Each of the holes 44 is an aperture and is circular. Each of the holes 44 is parallel to an axis 46 of the tube 34.

The second portion 38 of the telescopic shaft 28 is a pole 48. The pole 48 has a hollow interior 50 and is cylindrical. The pole 48 has a distal end 52 and a proximal end 54 relative to the grip 12. The proximal end 54 is inserted into the first portion 32. The first portion 32 remains in a fixed position relative to the second portion 38 whereby the second portion 38 can be moved for adjustment of the length of the telescopic shaft 28. The distal end 52 of the pole is a free end. The distal end 52 and the proximal end 54 have pair of holes 56. Each of the holes 56 is an aperture and is circular.

A pair of spring pins 58 is positioned in the hollow interior 50 of the pole 48. Each of the spring pins 58 has a pair of buttons 60. Each of the buttons 60 of a first spring pin 58A of the pair of spring pins 58 is positioned in each hole 56 of the pair of holes 56 of the distal end 52 of the pole 48. Furthermore, each of the buttons 60 of a second spring pin 58B of the pair of springs 58 is positioned in each hole 56 of the pair of holes 56 of the proximal end 54 of the pole 48.

The second spring pin 58B of the proximal end 54 of the pole 48 is configured for being inserted into a pair of holes 44A of the plurality of holes 44 of the tube 34 whereby retaining the pole 48 in a fixed length. The first spring pin 58A of the distal end 52 of the pole 48 is configured for being inserted into a pair of holes 62 of a utility attachment 64.

The utility attachment 64 has a base 66. The base 66 is cylindrical and has a cavity 68. The cavity 68 defines a space where the distal end 52 of the pole 48 can be lodged. The base 66 has the pair of holes 62. Each of the holes 62 is an aperture and is circular. Each of the buttons 60 of the first spring pin 58A of the distal end 52 of the pole 48 is inserted into a respective one of each of the holes 62 of the base 66 of the utility attachment 64.

The utility attachment 64 is configured for having a variety of configurations such as a rake 61, a hammer 63, a paddle 65, an axe 67, a walking stick head 69, a fish hook 71, and a spear 73. The utility attachment 64 is configured for being interchangeable whereby the user can remove and attach each of the configurations to the telescopic shaft 28.

Additionally, a hammock 70 with a rectangular shape has a pair of edges 72. Each of the edges 72 is parallel to each other. Each of the edges 72 has a sleeve 74 whereby the sleeve 74 defines a space for the telescopic shaft 28 to be stored. The hammock 70 is a fabric material 76 and is configured to be durable whereby the hammock 70 can support a range of weight without rupturing. The hammock 70 is configured for having each telescopic shaft 28 of a pair of telescopic shafts 29 being inserted into a respective one of the sleeve 74 of each of the edges 72.

In use, the user can attach the utility attachment 64 to the distal end 52 of the pole 48 of the telescopic shaft 28. The user can adjust the length of the telescopic shaft 28 by pushing in each of the buttons 60 of the second spring pin 58B and moving the pole 48 until the pair of buttons 60 inserts into the pair of holes 44B of the plurality of holes 44 of the tube 34.

The user can also use a pair of telescopic poles 29 to assemble the hammock 70. The user inserts each of the telescopic poles 29 into a respective one of the sleeves 74 of each of the edges 72 of the hammock 70. The hammock 70 is configured to be able to support a range of weight. The grip 12 of each of the telescopic shafts 29 and the distal end 52 of the pole 48 of each of the telescopic shafts 29 can be held by the user to carry the hammock 70.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A multipurpose utility attachment device comprising:
a grip, said grip being a handle, said grip having an end;
a pair of telescopic shafts, each said telescopic shaft comprising:
a first portion, said first portion being a tube, said tube having a hollow interior, said first portion having a distal end relative to said grip and a proximal end relative to said grip, said proximal end of said first portion being coupled to said end of said grip, a plurality of holes being positioned proximate to said distal end;
a second portion, said second portion being a pole, said pole having a hollow interior, said pole having a distal end and a proximal end relative to said first portion, said proximal end and said distal end having a pair of holes, said proximal end of said second portion being nested within said first portion, said first portion and said second portion engage by telescopic adjustment whereby said first portion remains in a fixed positioned relative to said second portion; and
a pair of spring pins, each of said spring pin having a pair of buttons, each of said buttons of a first spring pin of said pair of spring pins being positioned in said each of said holes of said proximal end of said first portion, each of said buttons of a second spring pin of said pair of spring pins being positioned in each of said holes of said distal end of said pole;

an utility attachment, said utility attachment having a base, said base having a cavity, said distal end of said second portion being configured for being inserted into said cavity of said utility attachment; and a hammock, said hammock having a pair of opposed edges, each of said opposed edges having a sleeve, said sleeve defining a space for receiving a respective one of said telescopic shafts wherein said pair of telescopic shafts provides rigidity to each of said opposed edges of said hammock.

2. The multipurpose utility attachment device of claim 1, further comprising said grip being cylindrical shaped.

3. The multipurpose utility attachment device of claim 1, further comprising said end being flat.

4. The multipurpose utility attachment device of claim 1, further comprising said grip having a bottom surface, said bottom surface having a plurality of cut outs, each of said cut outs being semicircular shaped, each of said cut outs defines a space for the fingers of the user to be positioned.

5. The multipurpose utility attachment device of claim 1, further comprising said first portion being concentric to said grip.

6. The multipurpose utility attachment device of claim 1, further comprising said distal end of said first portion being an open end.

7. The multipurpose utility attachment device of claim 1, further comprising each of said holes being an aperture, each of said holes being circular, said holes being parallel to each other and positioned diametrically opposed on said first portion.

8. The multipurpose utility attachment device of claim 1, further comprising said pole being cylindrical.

9. The multipurpose utility attachment device of claim 1, further comprising each of said spring pin being positioned within said hollow interior of said pole.

10. The multipurpose utility attachment device of claim 1, further comprising each of said buttons of said first spring pin being configured for fastening within each hole of a pair of holes of the plurality of holes of the first portion.

11. The multipurpose utility attachment device of claim 1, further comprising said utility attachment being a variety of configurations.

12. The multipurpose utility attachment device of claim 1, further comprising said base being a cylindrical shape, said base having a pair of holes.

13. The multipurpose utility attachment device of claim 12, further comprising each of said holes being an aperture, each of said holes being circular.

14. The multipurpose utility attachment device of claim 1, further comprising each of said buttons of said second spring pin being configured for being inserted into a respective one of each of said holes of said utility attachment whereby securing said utility attachment in a fixed position relative to said telescopic shaft.

15. The multipurpose utility attachment device of claim 1, further comprising said hammock being a rectangular shape, said hammock being a fabric material.

16. The multipurpose utility attachment device of claim 1, further comprising each of said edges being parallel to each other.

17. A multipurpose utility attachment device comprising:
a grip, said grip being a handle, said grip being cylindrical shaped, said grip having an end, said end being flat, said grip having a bottom surface, said bottom surface having a plurality of cut outs, each of said cut outs being semicircular shaped, each of said cut outs defines a space for the fingers of the user to be positioned;

a pair of telescopic shafts, each said telescopic shaft comprising:
a first portion, said first portion being a tube, said tube having a hollow interior, said first portion having a distal end relative to said grip and a proximal end relative to said grip, said proximal end of said first portion being coupled to said end of said grip, said first portion being concentric to said grip, said distal end of said first portion being an open end, a plurality of holes being positioned proximate to said distal end, each of said holes being an aperture, each of said holes being circular, said holes being parallel to each other and positioned diametrically opposed on said first portion;

a second portion, said second portion being a pole, said pole having a hollow interior, said pole being cylindrical, said pole having a distal end and a proximal end relative to said first portion, said proximal end and said distal end having a pair of holes, each of said holes being an aperture, each of said holes being circular, said proximal end of said second portion being nested within said first portion, said first portion and said second portion engage by telescopic adjustment whereby said first portion remains in a fixed positioned relative to said second portion; and a pair of spring pins, each of said spring pin being positioned within said hollow interior of said pole, each of said spring pin having a pair of buttons, each of said buttons of a first spring pin of said pair of spring pins being positioned in said each of said holes of said proximal end of said first portion, each of said buttons of said first spring pin being configured for fastening within each hole of a pair of holes of the plurality of holes of the first portion, each of said buttons of a second spring pin of said pair of spring pins being positioned in each of said holes of said distal end of said pole;

an utility attachment, said utility attachment being a variety of configurations, said utility attachment having a base, said base being a cylindrical shape, said base having a cavity, said base having a pair of holes, each of said holes being an aperture, each of said holes being circular, said distal end of said second portion being configured for being inserted into said cavity of said utility attachment, each of said buttons of said second spring pin being configured for being inserted into a respective one of each of said holes of said utility attachment whereby securing said utility attachment in a fixed position relative to said telescopic shaft; and a hammock, said hammock being a rectangular shape, said hammock being a fabric material, said hammock having a pair of opposed edges, said opposed edges being parallel to each other, each of said edges having a sleeve, said sleeve defining a space for receiving a respective one of said telescopic shafts wherein said pair of telescopic shafts provides rigidity to each of said opposed edges of said hammock.

* * * * *